United States Patent [19]
Tobita

[11] Patent Number: 4,517,595
[45] Date of Patent: May 14, 1985

[54] PAY TELEVISION CHANNEL SELECTOR

[75] Inventor: Katsumi Tobita, Soma, Japan

[73] Assignee: Alps Electric Co., Ltd., Tokyo, Japan

[21] Appl. No.: 311,061

[22] Filed: Oct. 13, 1981

[30] Foreign Application Priority Data

Oct. 15, 1980 [JP] Japan .................... 55-146598[U]

[51] Int. Cl.³ .................... H04N 7/16; H04K 1/00
[52] U.S. Cl. .................... 358/114; 455/187; 455/195
[58] Field of Search ................ 455/187, 195; 358/114

[56] References Cited

U.S. PATENT DOCUMENTS

| 3,760,097 | 9/1973 | Burroughs | 358/114 |
| 3,801,915 | 4/1974 | Ostuni et al. | 358/195 |
| 4,197,503 | 4/1980 | Dini | 455/195 |
| 4,232,396 | 11/1980 | Grimes | 358/114 |

Primary Examiner—S. C. Buczinski
Attorney, Agent, or Firm—Guy W. Shoup; Gerard F. Dunne

[57] ABSTRACT

In a pay television channel selector, a reception contract selecting portion comprises parallel circuits which are disposed in correspondence with channels and whose impedances are made different between the contracted and uncontracted channels, and a control circuit device whose output level changes depending upon the impedances of the parallel circuits, so that the scrambled broadcast of the contracted channel is descrambled on the basis of the output control signal of the control circuit device. The tapping of the uncontracted channel ascribable to the imperfection of a double lock preventive mechanism of multi-throw switches used as channel selecting switches can be prevented.

3 Claims, 5 Drawing Figures

PAY TELEVISION CHANNEL SELECTOR

BACKGROUND OF THE INVENTION

The present invention relates to pay television channel selectors, and more particularly to a pay television channel selector for CATV or the like in which a channel broadcast signal selected on the basis of a reception contract is received, and the tapping of an uncontracted channel signal is prevented.

In buildings such as apartment houses and the like, it is difficult to install antennas in the respective rooms. It is therefore common practice to install an antenna on the rooftop and to distribute signals received by the antenna to TV receivers in the respective rooms through cables. Further, in regions where reception of broadcast TV signals is difficult, cable systems have been provided to contractors or subscribers in order to distribute television signals to the viewers through transmission cables. In such CATV systems, pay television channel selectors through which only the signals of contracted channels can be viewed are typically provided. They are constructed so as to inhibit the contractors from viewing the signals of uncontracted channels.

A known pay television channel selector typical of the prior art will be described with reference to FIG. 1. In the figure, numeral 1 designates a reception portion for selecting channels which have been properly contracted for 2-A1 and 2-B1 indicate connecting terminals of Channel 1 (CH1) for a jumper lead, and 2-A2 and 2-B2 jumper lead terminals of Channel 2 (CH2). Similarly, 2-An and 2-Bn represent jumper lead terminals of Channel n (CHn). 3-1 indicates a jumper lead. In the example of FIG. 1, Channel 1 has been contracted for, and the jumper lead 3-1 is connected between the jumper lead terminals 2-A1 and 2-B1. In this manner, when Channel n is contracted, the jumper lead terminals 2-An and 2-Bn of Channel n (CHn) are short-circuited by the jumper lead 3-n. 4-1 to 4-n indicate pay channel switches, which interlock with respectively corresponding channel-selecting switches to be described later. Numeral 5 designates a pay control output terminal, numeral 6 a resistor, numeral 7 a power supply terminal, and numeral 8 a channel selecting portion. 9-1 to 9-n designate potentiometers for generating tuning voltages. The channel selecting switches 10-1 to 10-n are paired with the aforecited channel pay switches 4-1 to 4-n and perform interlocking operations therewith, respectively. Numeral 11 indicates a tuning voltage supply input terminal which is fed with a predetermined supply voltage, while numeral 12 indicates a tuning voltage output terminal which delivers as the tuning voltage of a receiving set a voltage produced in the tuning voltage generating potentiometer of the selected channel.

The operation of the pay television channel selector in FIG. 1 will be briefly described. In case where reception of Channel 1 (CH1) has been contracted for, the jumper lead 3-1 is connected between the jumper lead connecting terminals 2-A1 and 2-B1 of Channel 1 as shown in FIG. 1. Accordingly, when the contractor or subscriber selects Channel 1, in other words, when the channel pay switch 4-1 and the channel selecting switch 10-1 are turned "on", the ground voltage or a voltage of level "L" appears at the pay control output terminal 5. When any other channel is selected, a voltage connected to the power supply terminal 7 appears at the pay control output terminal 5 at all times because no jumper lead is connected between the jumper lead terminals. That is, the pay control output terminal 5 is made level "H". Needless to say, a signal with a scrambled picture is sent to the contractor in the CATV, and it cannot be received by ordinary receivers. In order to restore the scrambled picture signal, a descrambler circuit not shown needs to be operated. The contractor can receive the signal restored by the descrambler function. The descrambler circuit operates on the basis of the differences "H" and "L" of the voltage level appearing at the pay control output terminal 5. More specifically, when the level is "L", the descrambler circuit connected to the pay control output terminal 5 operates to discramble the picture. On the other hand, owing to the channel selecting switch 10-1 interlocked with the channel pay switch 4-1, a voltage divided by the tuning voltage generating potentiometer 9-1 appears at the tuning voltage output terminal 12. Then, Channel 1 is selected.

Usually, in CATV receivers, a multi-throw switch is employed as a selector switch in order to facilitate the selection of a particular channel. In many of the multi-throw switches, structures are provided for preventing two or more switches from being locked simultaneously, but these are often not satisfactory on account of technical difficulties and a restriction in cost. Therefore, the descrambler circuit may often be tapped to operate an uncontracted channel without paying a contract fee comparatively easily. An example of the tapping will now be explained. Let's consider a case where, as shown in FIG. 2, Channel 1 (CH1) and Channel 3 (CH3) have been contracted for and the jumper leads 3-1 and 3-3 have been placed between the respective terminals, but the subscriber has not contracted for Channel 2. The tapping of Channel 2 in this case will be explained. In the figure, numerals 1 to 12 correspond to those in FIG. 1. Since, in this case, Channel 3 is the contracted channel, the jumper lead 3-3 is connected between the jumper lead terminals 2-A3 and 2-B3.

As described above, the typical multi-throw switch forming the channel selecting switch is not satisfactory in preventing switches from being actuated simultaneously. Therefore, when Channel 1 and Channel 3 are simultaneously selected and locked, the channel pay switches 4-1 and 4-3 and the channel selecting switches 10-1 and 10-3 are simultaneously turned "on" as illustrated in FIG. 2. Thus, the pay control output terminal 5 assumes the ground potential or "L" level, and the reception contract selecting portion 1 becomes the reception mode. On the other hand, the tuning voltage output to terminal 12 is the divided voltage intermediate the voltages of the tuning voltage generating potentiometers 9-1 and 9-3. Since CATV broadcasting frequencies are arranged at substantially equal intervals, the intermediate divided voltage appearing at the tuning voltage output terminal 12 becomes approximately equal to a tuning voltage output for receiving Channel 2. By simultaneously locking the channel selecting switches of Channel 1 and Channel 3, therefore, it is permitted to normally operate the descrambler circuit for the uncontracted channel 2. In this manner, the prior-art channel selector has the disadvantage that the uncontracted channel signal can be tapped.

In another prior-art television channel selector, a reception contract selecting portion 1 is constructed conversely to that in FIG. 1. That is, jumper leads are connected to all channels in advance, the jumper leads are disconnected for contracted channels, and descrambler circuits are operated when the "H" level appears at a pay control output terminal 5. Also in this case, the same disadvantage as above described is involved.

SUMMARY OF THE INVENTION

The present invention has for its object to solve the disadvantage stated above and to provide a pay television channel selector which prevents the tapping of any uncontracted channel signal attributed to the drawback of a selector switch.

According to one aspect of performance of the present invention, a reception contract selecting portion comprises parallel circuits which are disposed in correspondence with channels and whose impedances are made different between a contracted channel and an uncontracted channel, and a control circuit device whose output level changes depending upon the impedances of the parallel circuits, so that a descrambler circuit is operated on the basis of the output signal of the control circuit device.

PREFERRED EMBODIMENTS OF THE INVENTION

Figure 1:
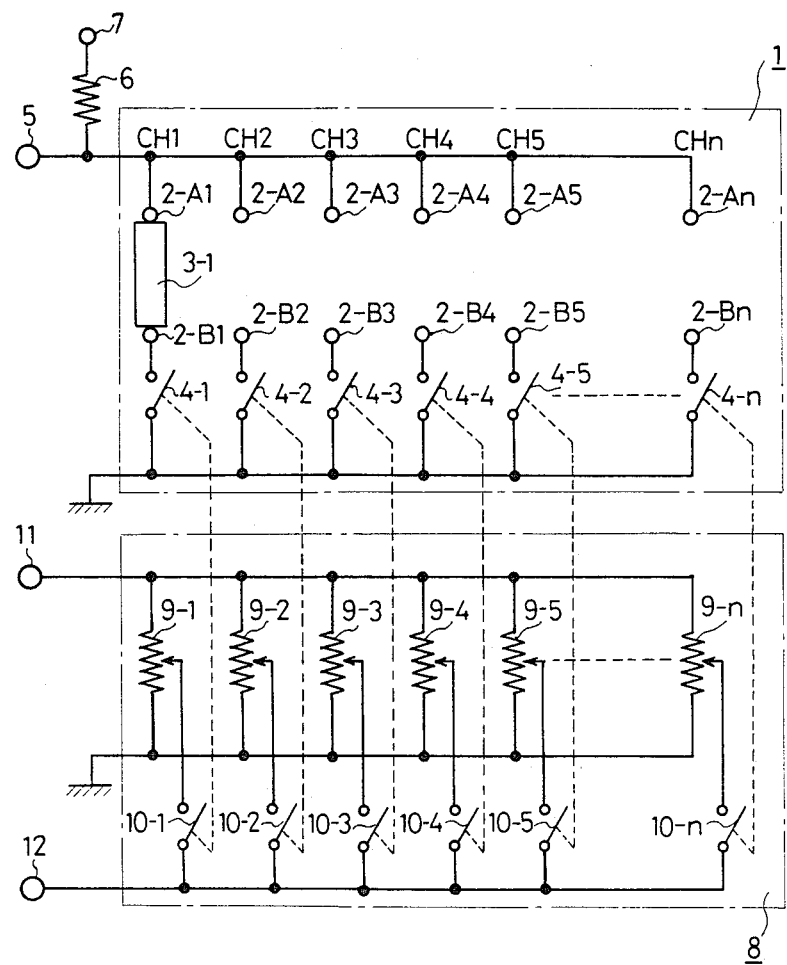
FIG. 1 is a circuit diagram showing an example of a prior-art pay television channel selector.
Figure 2:
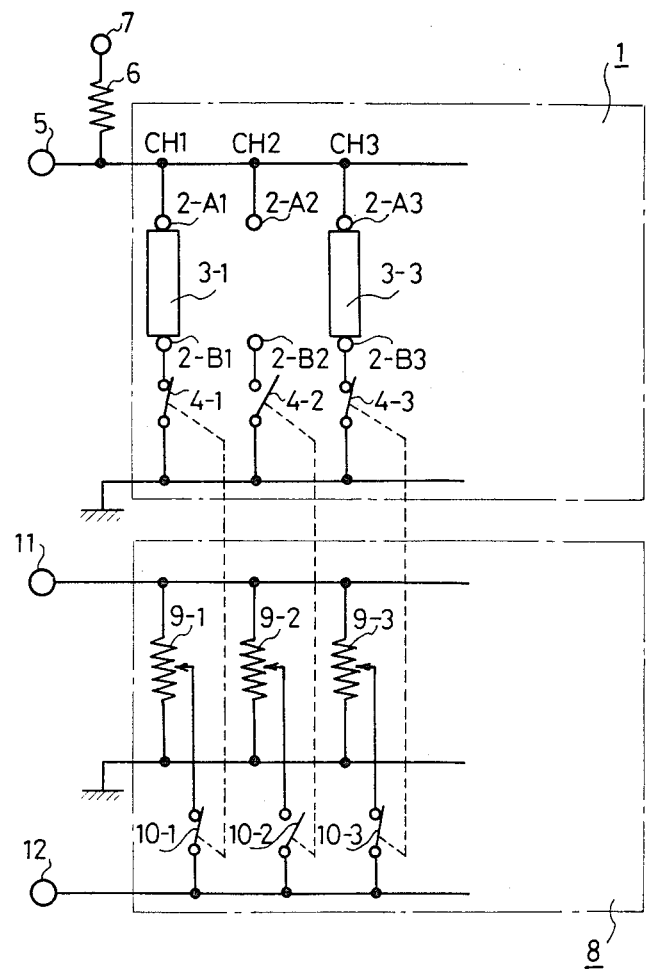
FIG. 2 is a diagram for explaining a tapped state in the prior-art pay television channel selector.
Figure 3:
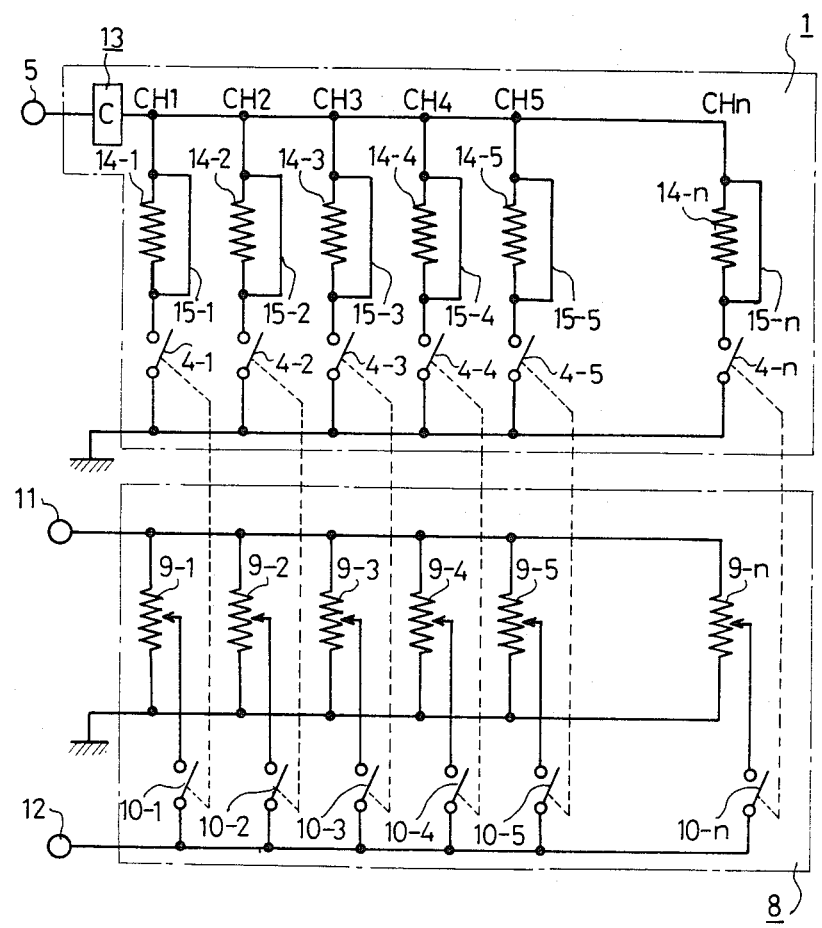
FIG. 3 is a circuit diagram showing an embodiment of a pay television channel selector according to the present invention.

In FIG. 3, numerals or symbols 1, 4-1 to 4-n, 5, and 8 to 12 correspond to those in FIG. 1. Numeral 13 designates a control circuit device, symbols 14-1 to 14-n resistors, and symbols 15-1 to 15-n short-circuiting leads.

FIG. 3 shows a pay television channel selector in the state in which the subscriber has not contracted for any pay channel. The resistors 14-1 to 14-n which are connected in series with the respective channel pay switches 4-1 to 4-n are respectively short-circuited by the short-circuiting leads 15-1 to 15-n. Therefore, even when any of the channel pay switches 4-1 to 4-n turns "on", the impedance of the resistors as viewed from the control circuit device 13 is zero.

When the subscriber contracts for a particular pay channel, the short-circuiting leads connected in parallel with the resistors of the contracted channels are disconnected. Supposing by way of example that the reception contract is made for Channel 1 (CH1) and Channel 3 (CH3), the short-circuiting leads 15-1 and 15-3 connected in parallel with the resistors 14-1 and 14-3 of the channels 1 and 3 respectively are disconnected.

Thus, when the channel selecting switch is set at Channel 1 by way of example, that is, when the channel pay switch 4-1 within the reception contract selecting portion 1 and the channel selecting switch 10-1 within the channel selecting portion 8 are operated simultaneously the impedance seen by the control circuit device 13 within the reception contract selecting portion 1 becomes R (in general, the resistors 14-1 to 14-n are set at $R_1 = R_2 = \ldots = R_n = R$). On the other hand, the applied voltage of the tuning voltage supply input terminal 11, as divided by the tuning voltage generating potentiometer 9-1, appears at the tuning voltage output terminal 12. Further, when the channel selecting switch is set at Channel 3, that is, when the channel pay switch 4-3 and the channel selecting switch 10-3 are operated simultaneously, the impedance seen by the control circuit device 13 becomes R as in the case of Channel 1. On the other hand, the supply voltage at the tuning voltage supply input terminal 11, as divided by the tuning voltage generating potentiometer 9-3, appears at the tuning voltage output terminal 12.

Assuming that Channels 1 and 3 have been simultaneously selected by the channel selecting switches, the channel pay switches 4-1 and 4-3 within the reception contract selecting portion 1 turn "on". Therefore, the impedance as viewed from the control circuit device 13 consists of the resistors 14-1 and 14-3 connected in parallel, and its value becomes ½R. Supposing the control circuit device 13 is to be constructed so that its output may become the "L" level only when the impedance takes the value R, then the output of the control circuit device 13 becomes the "H" level when the impedance becomes the value R/2. At this time, accordingly, the control circuit device 13 functions to prevent the operation of the descrambler circuit connected to the pay control output terminal 5. As a result, the disadvantage of the prior art that Channel 2 can be tapped is eliminated. Now, the control circuit device 13 will be described.

Figure 4:
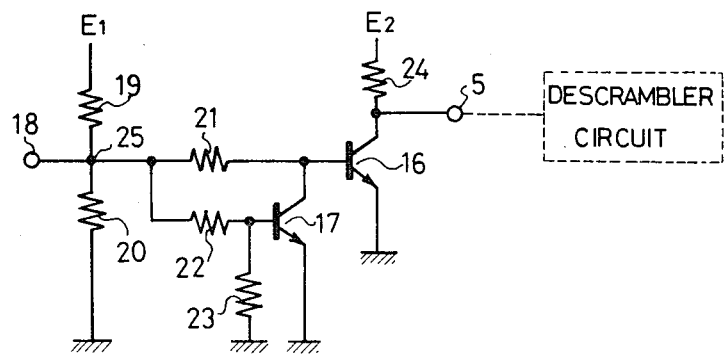
FIG. 4 is a circuit diagram showing an embodiment of a control circuit device.

In FIG. 4, numeral 5 corresponds to that in FIG. 3. Numeral 16 designates a first transistor, and numeral 17 a second transistor. Shown at numeral 18 is a resistor connecting terminal, to which the impedance of the reception contract selecting portion 1 as viewed from the control circuit device 13 is connected. Numerals 19 to 24 indicate resistors, and numeral 25 indicates a first voltage division node.

Figure 5:
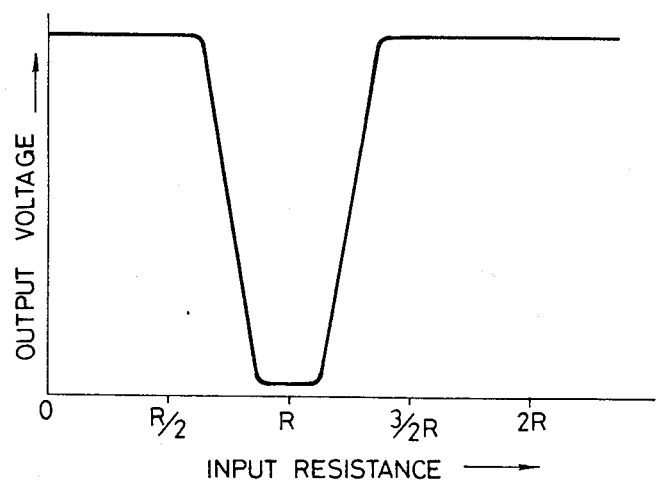
FIG. 5 illustrates the output voltage-versus-input resistance characteristics for explaining the operation of the control circuit device.

FIG. 5 shows the output of the control circuit device 13 in FIG. 4, that is, the output of the pay control output terminal 5. The illustrated characteristics signify that when a resistance of at most R/2 (including a null resistance) is connected to the resistor connecting terminal 18 in FIG. 4 and when a resistance of at least 3R/2 is connected thereto, the pay control output terminal 5 lies at the "H" level, whereas only when a resistance of or near the value R is connected, the pay control output terminal 5 becomes the "L" level. The control circuit device 13 in FIG. 3 is endowed with the characteristics as shown in FIG. 5.

Referring back to FIG. 4, when the resistor connecting terminal 18 is grounded, the first transistor 16 falls into the "off" state because its base current fails to flow, and hence, its output terminal or the pay control output terminal 5 becomes the "H" level. In case where the high resistance of at least 3R/2 is connected to the resistor connecting terminal 18, the voltage of the node 25 between the resistors 19 and 20 is further divided by the resistors 22 and 23, to bring the second transistor 17 into the "on" state. Therefore, the base current of the first transistor 16 fails to flow, and the pay control output terminal 5 becomes the "H" level. In contrast, when the resistance of or near the value R is connected to the resistor connecting terminal 18, the combined resistance value between the resistance value R and the resistance of the resistor 20 becomes small, so that the voltage of the node 25 between the resistors 19 and 20 decreases.

Thus, current fails to flow to the base of the second transistor 17 and this second transistor 17 falls into the "off" state, whereas current flows to the base of the first transistor 16 and only this first transistor 16 falls into the "on" state. That is, the pay control output terminal 5 becomes the "L" level. Also in case where the resistance value R/2 is connected to the resistor connecting terminal 18, the pay control output terminal 5 lies at the "H" level because the resistors 19 to 23 are set so that the second transistor 17 may fall into the "on" state and that the first transistor 16 may fall into the "off" state. The characteristics of FIG. 5 are obtainable by setting $R = 680\Omega$, $R_{20} = 820\Omega$ and $R_{19} = R_{21} = R_{22} = R_{23} = 10k\Omega$ by way of example.

When Channels 1 and 3 explained with reference to FIG. 3 have been simultaneously selected in opposition to the control circuit device 13 having the characteristics as shown in FIG. 5, the impedance as viewed from the control circuit device 13 is $\frac{1}{2}R$ which is the combined resistance value of the parallel resistors 14-1 and 14-3. As apparent from FIG. 5, therefore, the pay control output terminal 5 is at the "H" level. As described before, the descrambler circuit connected to the pay control output terminal 5 is constructed so as not to operate under the "H" level. Therefore, the descrambler circuit not shown does not establish the reception mode, and no tapping is possible.

In contrast, when Channel 1 is selected by way of example, the impedance as viewed from the control circuit device 13 becomes R due the resistor 14-1, this resistance value R is connected to the control circuit device 13, and the pay control output terminal 5 is at the "L" level as apparent from FIG. 5. Accordingly, the descrambler circuit operates to establish the reception mode, and the signal of Channel 1 is selected from among the scrambled broadcasts by the divided voltage of the tuning voltage generating potentiometer 9-1 as appears at the tuning voltage output terminal 12.

In the absence of the control circuit device 13, the tapping of, e.g., Channel 2 might be made by setting the channel selecting switch at Channel 2 for a moment and thereafter locking none of the channels. This tapping may be construed as follows. In the state in which the channel selecting switch has been momentarily selected to Channel 2, a voltage corresponding to the resistor 9-2 appears at the tuning voltage supply input terminal 11 for a moment, and this voltage is temporarily held in capacitors existent in a tuning circuit portion not shown. Thereafter, the channel selector is put into the state in which no channel is locked. In the absence of the control circuit device 13, therefore, the potential of the pay control output terminal 5 operates the descrambler circuit and the reception mode is established. That is, it becomes possible to temporarily receive Channel 2. By repeating such operations, it becomes possible to tap Channel 2.

In case of the present invention, however, the control circuit device 13 is disposed as described above, so that the output of the control circuit device 13 keeps the "H" level in spite of the repeated operations as stated above and that the descrambler circuit does not operate.

As set forth above, according to the present invention, the tapping of an uncontracted channel signal ascribable to the imperfection of the double lock preventive mechanism of multi-throw switches used as channel selecting switches can be reliably prevented at low cost, and also the tapping based on erroneous operations is prevented. Needless to say, the construction in which resistors are connected to contracted channels can be adopted in FIG. 3 without any substantial change.

What is claimed is:

1. In a pay television channel selector for CATV having a channel selecting means including channel selecting switches for selecting among the various channels and potentiometers connected to said channel selecting switches for generating tuning voltages for the respective channels; and control means including a plurality of channel pay switches each corresponding to a respective channel selecting switch for producing a control voltage when the channel selected by the channel selecting switches is properly contracted for in order to activate a descrambler circuit; the improvement wherein said control means comprises a plurality of parallel circuits with each of said parallel circuits being connected to a respective one of said channel pay switches and having an output level changed according to an input signal having said common impedance so that a scrambled signal of a contracted channel may be descrambled on the basis of the output control signal of said control circuit.

2. A pay television channel selector according to claim 1, wherein said control circuit comprises a first transistor for controlling the output voltage of said control circuit, a second transistor for determining an operating state of said first transistor, a first voltage division node connected with an input terminal of said control circuit, and a second voltage division node connected with said first voltage division node for further dividing a potential of said first voltage division node, and means including a plurality of resistors connecting said first and second transistors for controlling the potentials of said first and second voltage division nodes in any of three modes including a first mode in which both said first and second transistors are rendered nonconductive, a second mode in which only said first transistor is rendered conductive and a third mode in which only said second transistor is rendered conductive, said modes being selected in correspondence with the impedance of at least one of the parallel circuits connected to said input terminals, and the scrambled signal of the contracted channel is descrambled in only said second mode.

3. A pay television channel selector according to claim 1, wherein the impedances of said parallel circuits each are a resistance value greater than zero for the contracted channel and a resistance value substantially at zero for the uncontracted channel.

* * * * *